US008923891B2

(12) United States Patent
Jain et al.

(10) Patent No.: US 8,923,891 B2
(45) Date of Patent: Dec. 30, 2014

(54) INTELLIGENT LOCATION TAGGING FOR DETERMINISTIC DEVICE BEHAVIOR

(75) Inventors: Puneet K. Jain, Hillsboro, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 13/530,451

(22) Filed: Jun. 22, 2012

(65) Prior Publication Data

US 2013/0084885 A1    Apr. 4, 2013

Related U.S. Application Data

(60) Provisional application No. 61/542,726, filed on Oct. 3, 2011.

(51) Int. Cl.
*H04W 24/00* (2009.01)
*H04W 4/00* (2009.01)
*H04W 28/02* (2009.01)

(52) U.S. Cl.
CPC .......... *H04W 4/005* (2013.01); *H04W 28/0215* (2013.01)
USPC .................. 455/456.4; 455/456.1; 455/456.3; 455/456.6

(58) Field of Classification Search
CPC .......... H04W 4/02; H04W 8/08; H04W 48/04
USPC ............................................ 455/456.4, 456.1
See application file for complete search history.

(56) References Cited

U.S. PATENT DOCUMENTS

| 5,778,304 | A  | * | 7/1998  | Grube et al. ............... 455/456.4 |
| 7,263,353 | B2 | * | 8/2007  | Forsberg et al. ............. 455/420 |
| 8,195,198 | B1 | * | 6/2012  | Shaw et al. ................. 455/456.4 |
| 2005/0064856 | A1 | * | 3/2005  | Atkin et al. .................... 455/418 |
| 2007/0266396 | A1 | * | 11/2007 | Estermann ...................... 725/25 |
| 2011/0230211 | A1 | * | 9/2011  | Kim et al. .................. 455/456.4 |
| 2011/0250862 | A1 | * | 10/2011 | Schliwa-Bertling et al. ......................... 455/404.1 |

* cited by examiner

*Primary Examiner* — Mazda Sabouri
(74) *Attorney, Agent, or Firm* — Cool Patent, P.C.

(57) ABSTRACT

Briefly, in accordance with one or more embodiments, a deterministic device behavior system detects if a device is entering a sensitive location. The sensitive location may be a movie theater, hospital, law enforcement agency, public restroom or locker room, meeting room, factory, or similar location. If the device enters the sensitive location, the device is triggered to query a location database to obtain one or more policies related to deterministic behavior. The policies are transmitted to the device to execute the deterministic behavior while the device is in the sensitive location. The deterministic behavior may include disabling one or more modules of the device such as the camera, microphone, speaker, annunciator, vibrator, and so on, where the use of such modules may be inappropriate or prohibited in the sensitive location. The policies may be implemented manually by the user or automatically by the device.

27 Claims, 10 Drawing Sheets

INTELLIGENT LOCATION TAGGING FOR DETERMINISTIC DEVICE BEHAVIOR

CROSS-REFERENCE TO RELATED APPLICATIONS

The present application claims the benefit of U.S. Provisional Application No. 61/542,726 filed Oct. 3, 2011 (P40031Z). Said Application No. 61/542,726 is hereby incorporated herein by reference in its entirety.

BACKGROUND

Proliferation of smartphones and other handheld computing devices has brought a substantial change in the ways humans communicate. This proliferation also has brought some amount of nuisance to society. Many people simply do not follow cell phone etiquette or may just simply forget about it. Such etiquette may include switching off a cell phone or the ringer in certain locations such as movie theaters, hospitals, or immigration areas, or to refrain from phone photography in sensitive areas such as public restrooms or showers. Many people are even not aware of the etiquette or rules that should be followed in such sensitive areas.

Another issue may arise when notifications are received while roaming in different time zones. Smartphones often include a calendar program that provides a notification for a meeting or for some other user event, for example a notice provided a present time in advance of the meeting or event. However, while roaming such calendar notification behavior may become a problem. For example, if the user is in a different geographical location such as China or India, the smartphone may provide a user notification in the middle of the night at a time based on the user's home time zone in the USA. Calendars or other time based notification applications may not be properly synchronized and therefore may not take into account the user's present location or preferences.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
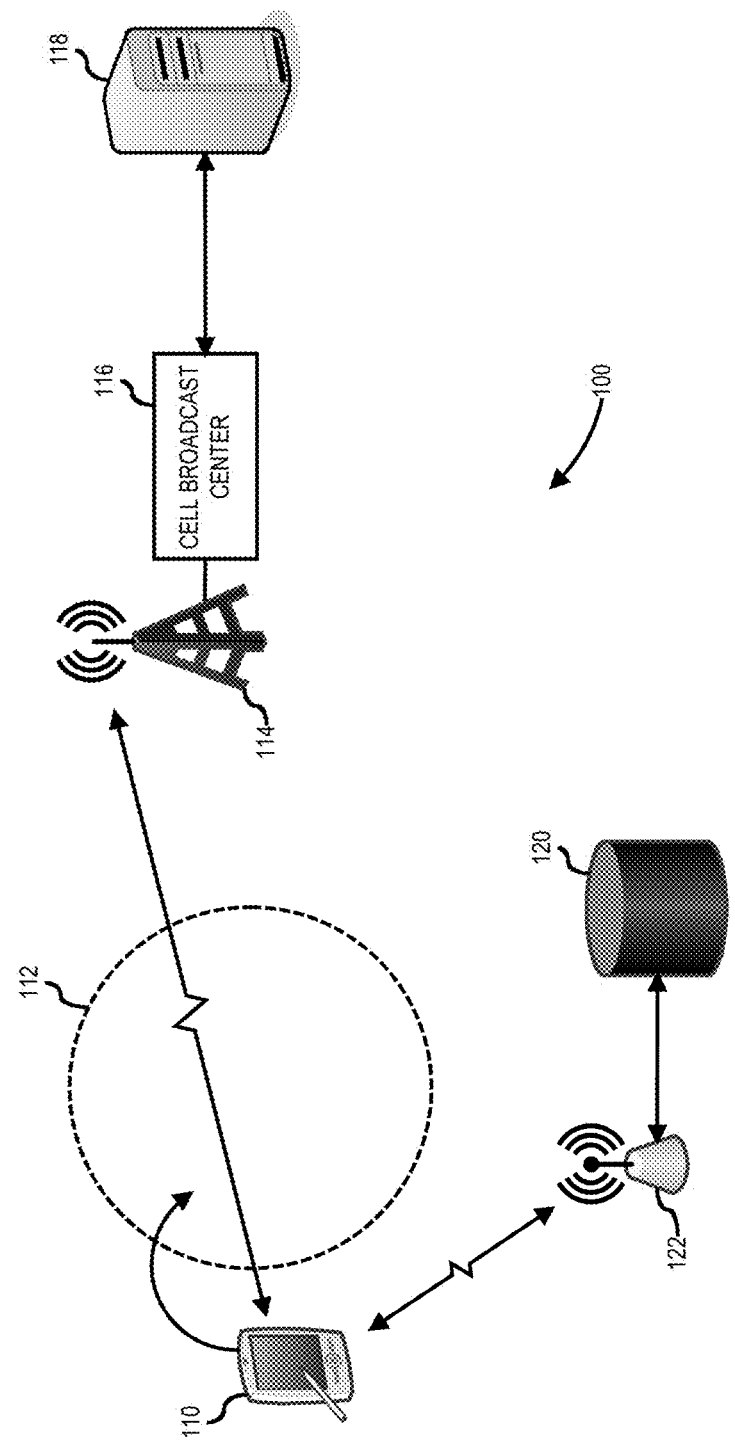
FIG. 1 is a diagram of an intelligent location system to provide deterministic device behavior in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 2:
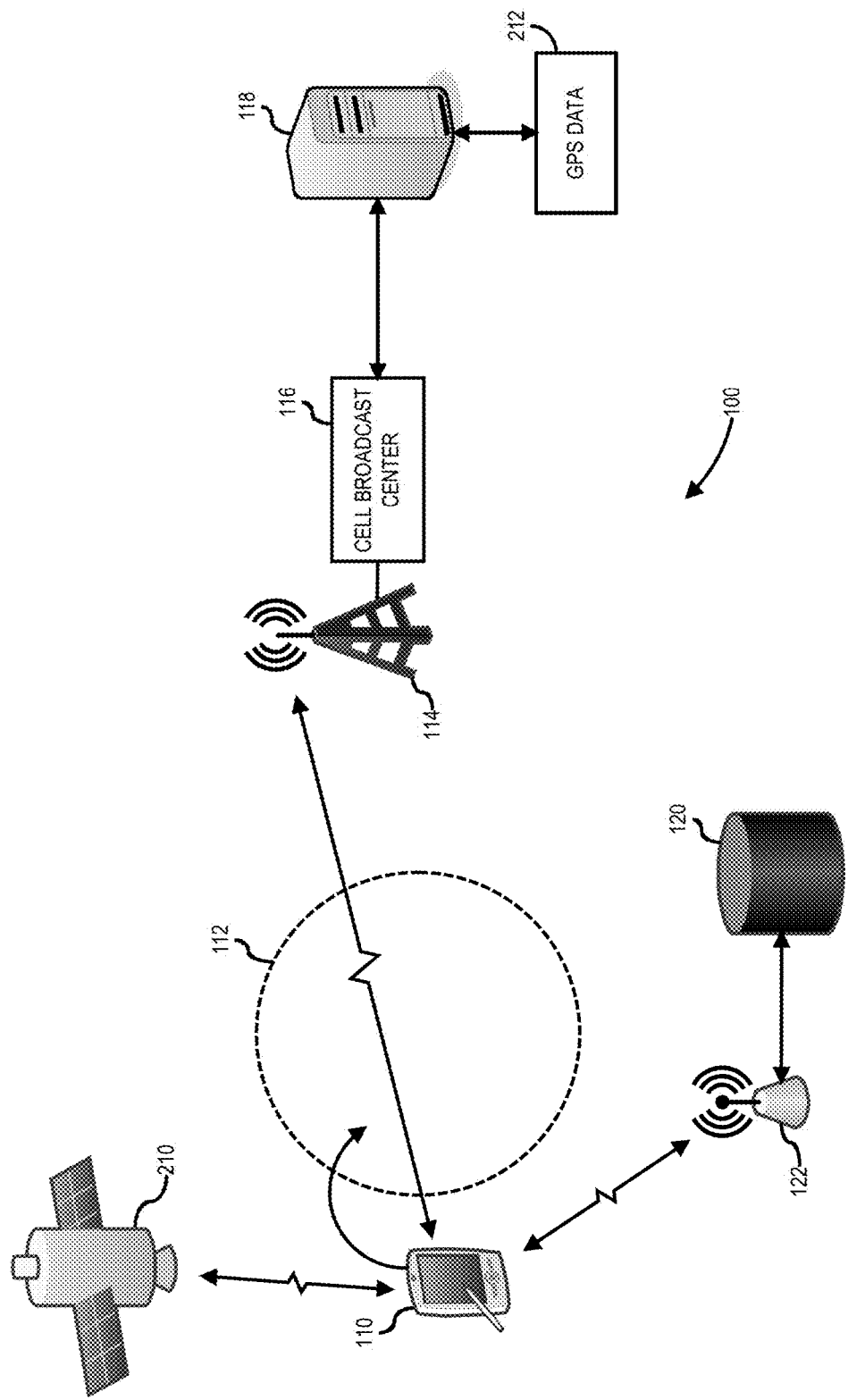
FIG. 2 is a diagram of an intelligent location system to provide deterministic device behavior utilizing Global Positioning System (GPS) data in accordance with one or more embodiments.

Referring now to FIG. 1 and FIG. 2, diagrams of an intelligent location system to provide deterministic device behavior in accordance with one or more embodiments will be discussed. As shown in FIG. 1, a deterministic system 100 may be directed to a device 110 which may comprise a cellular telephone, smartphone, tablet or pad, or similar type of computing device or information handling system. In some embodiments, device 110 may comprise a mobile station (MS) or user equipment (UE) based on the terminology of the particular network standard utilized by deterministic system 100. An example of such a device or information handling system is shown in and described with respect to FIG. 9 and FIG. 10, below. Typically, the device 110 may include some wireless communication system such as wireless local area network (WLAN) system, wireless wide area network (WWAN) system or cellular network system, near field communication system, and/or a personal area network (PAN) system such as Bluetooth, for remote communication with one or more other devices. Furthermore, device 110 may include one or more modules, subsystems, or devices to perform various functions such as cameras, microphones and speakers. Such modules may provide useful functions for the device 110, however it may not be appropriate for the user of the device 110 to use one or more of the subsystems in a designated sensitive location 112. In one or more embodiments, a sensitive location 112 may comprise any geographical area, region, room, auditorium, building, and so on that may have one or more policies governing, controlling or regulating the operation of electronic devices or systems of the devices while in, around or near the sensitive location. Deterministic system 100 operates to provide deterministic device behavior based on intelligent location tagging by determining the location of device 110 and determining when device has entered, is entering, or is about to enter sensitive location 112. In one or more embodiments, the device 110 or the user of the device 110 may be prompted to turn off one or more of the modules of the device 110, or the shutdown of the modules may happen automatically, while the device 110 is within the sensitive location 112. An example of a sensitive location 112 may include a public restroom, bank, office building, factory, hospital, school, locker room, movie theater, police station, and so on. In some embodiments, deterministic system 100 may notify the user that the device 110 has entered into the sensitive location 112, and will notify the user of the policy for that sensitive location 112, for example no photography is allowed the public restroom, or no audible alerts are allowed in the movie theater. In other embodiments, the user may be required to accept and agree to adhere to the controlling policies of the sensitive area 112 as a condition for entry. If the user accepts to be bound by the policies, the user will be granted entry into sensitive area 112. Otherwise entry will be denied and/or otherwise unauthorized. In yet other embodiments, the device 110 will automatically implement the policies while the device 110 is located within sensitive area 112, for example the device 110 will automatically disable the camera module of the device 110 thereby preventing any photography. When deterministic system 100 detects that the device 110 has exited the sensitive location 112, the user or device 110 may be notified that the policies are now no longer in enforcement, and/or the device 110 may automatically turn back on the modules that were previously shut down or disabled.

In one or more embodiments, deterministic system 100 may include three main portions. The first portion comprises a triggering portion which may provide a mechanism to trigger the device 110 when the device 100 is in the sensitive location 112. The second portion comprises a deterministic policy download portion which, in response to the trigger event, may cause the device 110 to initiate connection to a location database/server 120 to obtain the policy or policies related to deterministic behavior. The third portion comprises applying the policies in which the downloaded policies are applied to one or more modules of the device 110, and which optionally may also take into account one or more user preferences. It should be noted that these are merely example components of deterministic system 100, which may be modified, reduced, enhanced, eliminated, or added to in one or more alternative embodiments, and the scope of the claimed subject matter is not limited in these respects.

The deterministic system 100 may operate as follows in one or more embodiments. A cell broadcast entity (CBE) 118 may send a trigger indication to cell broadcast center (CBC) 116, which may include or be coupled to a radio-frequency transceiver 114 or similar device such as an access point or base station, to initiate triggering of one or more devices 110 when the devices are detected as entering into the sensitive location 112. In one or more embodiments, cell broadcast center 116 may comprise a wireless access point or base station operating in compliance with an Institute of Electrical and Electronics Engineers (IEEE) standard such as the IEEE 802.11n standard or similar, to communicate with device 110 via a wireless local area network (WLAN). In one or more alternative embodiments, cell broadcast center 116 may comprise a base transceiver station (BTS) or enhanced Node B (eNB) operating in compliance with a Third Generation Partnership Project (3GPP) standard, a Long Term Evolution (LTE) standard or an Advanced-LTE standard or similar, to communicate with device 110 via a wireless wide area network (WWAN) or cellular network. In some embodiments, the WWAN may be compliant with a Worldwide Interoperability for Microwave Access (WiMAX) standard or a WiMAX-II standard, for example in accordance with an IEEE 802.16e standard or an IEEE 802.16m standard. However, these are merely examples of the types of networks that cell broadcast center 116 may implement, and the scope of the claimed subject matter is not limited in these respects.

The cell broadcast entity 118 may be operated by an organization such as a hospital, movie theater, law enforcement agency, and so on. The cell broadcast entity 118 may define the geographical boundary of the particular sensitive location 112 where deterministic behavior is desired for the device 110. For example, a law enforcement agency may define that the cell broadcast center 116 permits a number of unacknowledged general messages to be broadcast to all devices 110 within the sensitive location 112. Cell broadcast center 116 may transmit cell broadcast service (CBS) messages to defined geographical areas known as cell broadcast areas. Such areas may comprise one or more cells in a cellular communication network, or may comprise an entire network. Individual cell broadcast service messages may be assigned their own geographical coverage areas defined as sensitive location 112 by mutual agreement between a third party information provider and a Mobile Network Operator. In some embodiments, the message may include Global Positioning System (GPS) coordinates as shown for example in FIG. 2, wherein the location of device 110 may be determined based at least in part on signals received from a constellation of space vehicles 210. In such embodiments as shown in FIG. 2, cell broadcast entity 118 may include GPS data 212 that may be provided to cell broadcast center 116 so that the deterministic system 100 may execute the trigger based at least in part on the GPS location of device 110, although the scope of the claimed subject matter is not limited in this respect.

If a device 110 is detected as entering sensitive location 112, the trigger may be sent as cell broadcast service (CBS) messages from the cell broadcast center 116 to the device 110 in response to the device 110 being located within sensitive location 112. Technical realization of the cell broadcast service (CBS) is defined in the Third Generation Partnership Project (3GPP) standard 3GPP TS 23.041, although the scope of the claimed subject matter is not limited in this respect. In the event that the cell broadcast entity 118 indicates the GPS location of the sensitive area 112 as shown in and described in FIG. 2, modification of the CBS message structure and encoding may be involved. Other enhancements such as sending the policies or control command inside the CBS message for deterministic device behaviors may be implemented as well. A message from the cell broadcast center 116 may contain the address of location database/server 120 as well from which the policy or policies may be obtained by device 110. In one or more embodiments, the location database/server 120 may be capable of communicating with device 110 via an appropriate access point 122 or base station.

Once the device 110 enters into or at or near the border of sensitive location 112, the device 110 will receive the broadcast trigger message as a CBS message from the cell broadcast center 116. Based at least in part on the data provided in the CBS message, the device 110 will be prompted to or will automatically query the location database/server 120 to get the policy specific to that sensitive location 112. Location database/server 120 has location information indicated for device 110 tagged with certain policies. Such policies may warrant deterministic behavior from the device 110. Location database/server 120 will respond to the query by sending the policy for that particular sensitive location 112 back to the device 110. Such a policy may indicate, for example, shut off the camera of the device 110 while inside sensitive location 112 or while in a subset area X of sensitive location 112, turn off the speaker and switch to vibration mode wile inside sensitive location 112 or while in a subset area Y of sensitive location 112, and so on. The device 110 further may take into account one or more user preferences such as enforce the policies automatically or send an indication or notification to the user to apply the policies manually. In alternative embodiments, when policies are sent within a CBS message, query to the location database/server 120 by the device 110 may not be necessary.

In one or more embodiments, a cell broadcast entity different from cell broadcast entity 118 may interact with the location database/server 120 to tag the sensitive location 112 with specific policies. Such tagging may happen asynchronously to the above mentioned procedures. It should be noted that the policies discussed herein are merely examples for purposes of illustration, wherein deterministic system 100 may be adapted to other scenarios as well, and the scope of the claimed subject matter is not limited in these respects.

Figure 3:
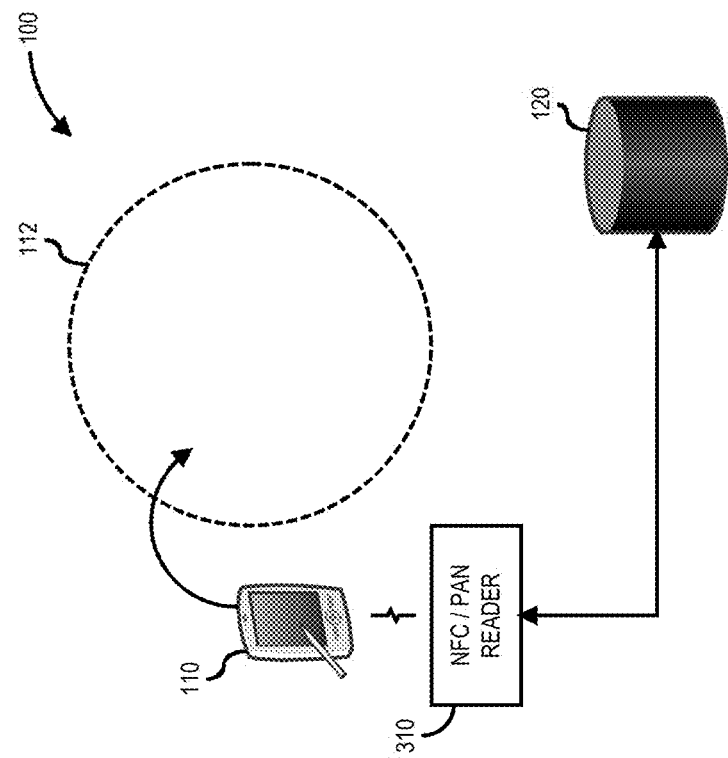
FIG. 3 is a diagram of an intelligent location system to provide deterministic device behavior utilizing near field communications or personal area network communications in accordance with one or more embodiments.

Referring now to FIG. 3, a diagram of an intelligent location system to provide deterministic device behavior utilizing near field communications or personal area network communications in accordance with one or more embodiments will be discussed. In one or more embodiments, alternative mechanisms may be employed to determine if device 110 has entered a sensitive location 112. Such alternative mechanisms include Global Positioning System (GPS) location data, cellular location data, snooping of transmission from the device 110 at the sensitive location 112, wherein the transmissions by the device 110 are snooped by a snooping entity at the location of sensitive area 112. The transmissions may include the temporary identifier (ID) of the device 110 in use. The snooped information may be provided to the trigger entity which may attempt to map the snooped ID, for example a temporary mobile subscriber identity (TMSI), to an actual ID of the mobile network operator (MNO) to which the device 110 subscription belongs in order to trigger the device 110 if a match is found.

In the embodiment shown in FIG. 3, near field communication (NFC) commands may be employed, for example using an NFC or personal area network (PAN) module in device 110 that may communicate with an NFC or PAN reader 310 or access point coupled with location database/server 120. In one or more embodiments, such NFC or PAN systems may implement a Bluetooth or similar standard, although the scope of the claimed subject matter is not limited in this respect. As an example, a law enforcement agency may implement security screening as the device 110 enters sensitive location 112 and may instruct the user to touch or wave the device 110 near NFC/PAN reader 310, which may then trigger the device 112 to obtain policies from location database/server 120. Such policies may include, for example, a command to disable the camera of device 110 while the device 110 is within the sensitive location 112. In one particular example, the determination whether device 110 is located within sensitive location 1120 may be based at least in part on GPS coordinates as shown for example in FIG. 2.

Figure 4:
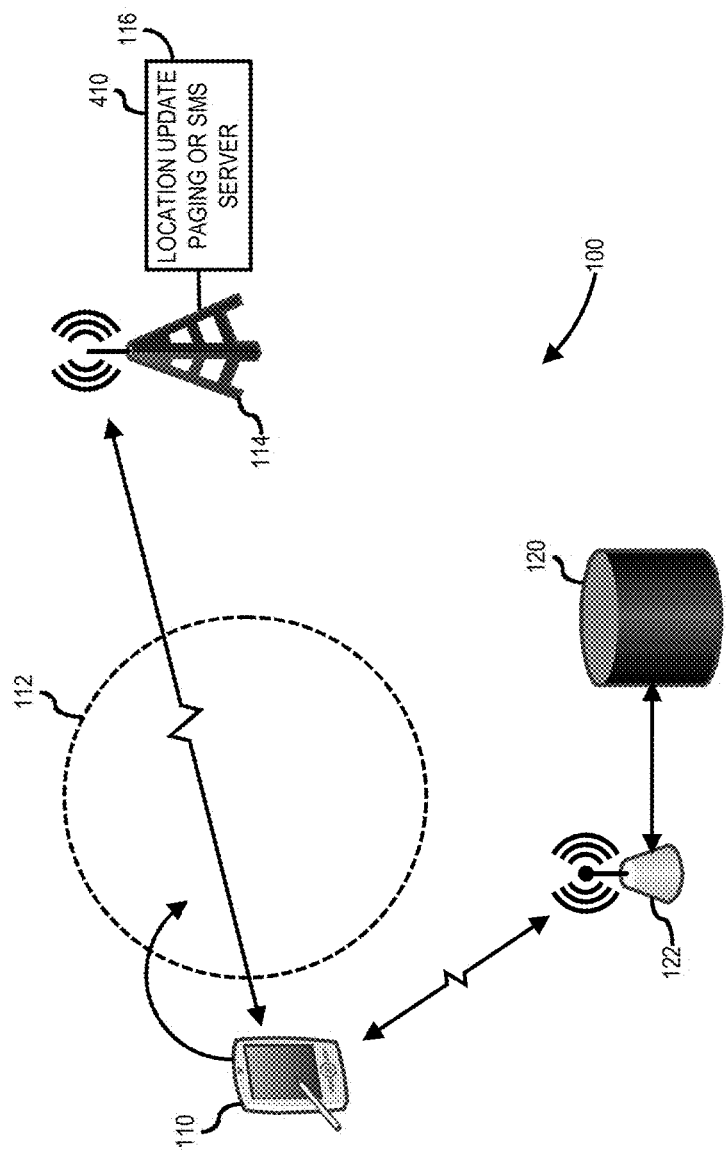
FIG. 4 is a diagram of an intelligent location system to provide deterministic device behavior utilizing a location update, paging, or a short message service (SMS) server in accordance with one or more embodiments.

Referring now to FIG. 4, a diagram of an intelligent location system to provide deterministic device behavior utilizing a location update, paging, or a short message service (SMS) server in accordance with one or more embodiments will be discussed. In the embodiments shown in FIG. 4, cell broadcast center 116 may comprise a server 410 comprising a location update server, a paging server, and/or a short message servers (SMS) server or the like. Where server 410 comprises a location update sever, the server 410 may communicate with device 110 while device 110 is in an idle mode. Sensitive location 112 may be configured such that when device 110 enters sensitive location 112, device 112 may be triggered to perform a location, routing, or tracking area update. Once the deterministic system 100 is aware that device 110 has entered sensitive location 112, deterministic system 100 may prompt the device 110 to download the policies for sensitive area 112 as part of a Location/Routing/Tracking Area Accept message. Where server 410 comprises a paging server, the server 410 may communicate with device 110 while device is in an idle mode wherein a special paging indicator may be utilized to trigger the device 110 to download the policies for sensitive area 112. Where server 410 comprises an SMS server, the server 410 may communicate with device 110 via an SMS application or similar application via an application layer to prompt the device 110 to download the policies for sensitive area 112. It should be noted these are merely examples of the types of servers 410 that may be implemented by cell broadcast center 116 wherein other types of servers may likewise be implemented, and the scope of the claimed subject matter is not limited in these respects.

Figure 5:
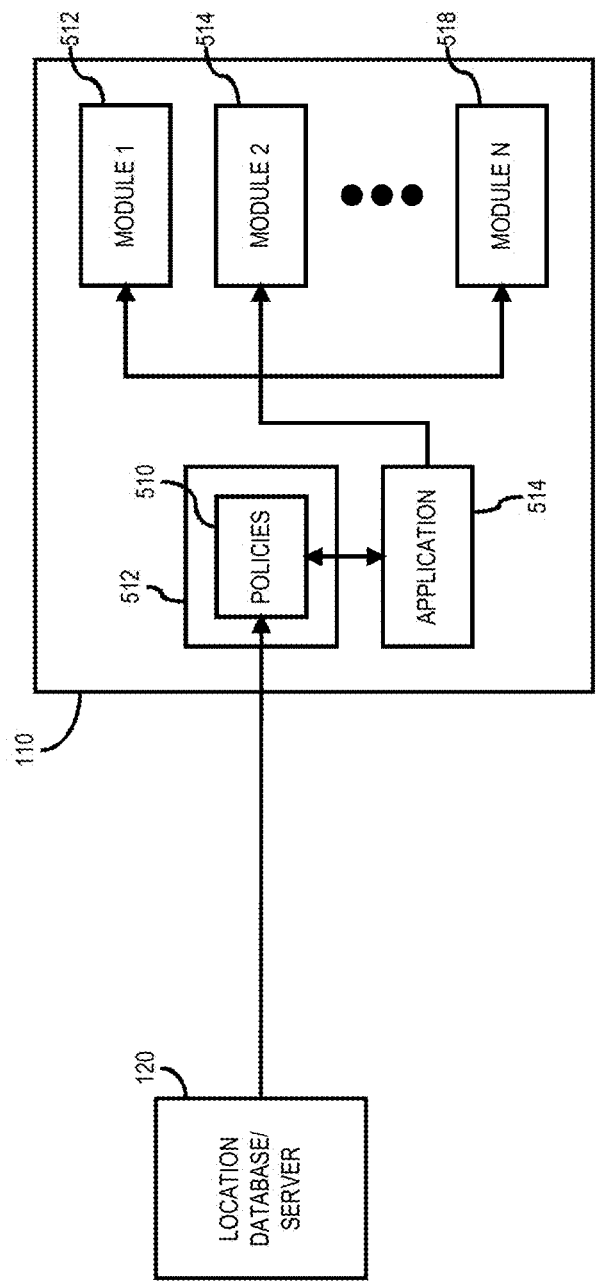
FIG. 5 is a diagram of a mobile station capable of downloading policies from a policy server to control one or more modules of the mobile station in accordance with one or more embodiments.

Referring now to FIG. 5, a diagram of a mobile station capable of downloading policies from a location database or server to control one or more modules of the mobile station in accordance with one or more embodiments will be discussed. As shown in FIG. 5, device 110 may have one or more modules 512, 514, up to Nth module 518, which may correspond to one or more hardware devices such as cameras, speakers, microphones, annunciators, vibrators, and so on, and/or which may comprise one or more software modules or applications such as a calendar module, telephone ringer, music program, camera application, audio recording application, and so on. The device 110 may download one or more policies 510 for sensitive location 112 from location database/server 120 wherein the policies may be at least temporarily stored in a memory 512 of device 110. The policies may instruct the device 110 or the user of the device 110 to shut down or disable one or more of the modules while the device 110 is operating within sensitive location 112. In one embodiment, the policies 510 may be simply communicated to the device 110 as a text message, email, notification, or similar communication. In such an embodiment, the user may read the policy and turn off or disable the modules manually based on the policies in the communication. The message further may require the user to accept the terms and conditions of the policies as a condition of entry into the sensitive location 112.

In other embodiments, the policies may be implemented automatically by the device 110, for example via a policy enforcement application 514 running on device 110 or otherwise built into the device 110 such as in the firmware of the device 110. Such an application 514 may be capable of interpreting the policies 510 and controlling the operation of the modules of the device 110 in order to enforce the policies. In other embodiments, the user may have control over whether the device 110 automatically executes the policies 510 when received. For example, in the settings of the device 110, the user may select to have sensitive location policies 510 automatically implemented, or select to have them not be automatically implemented. By having the policies 510 automatically implemented, the user may want to be compliant with the policies 510 without requiring further action or steps by the user, for example to avoid the embarrassment of unintentionally violating the policies during a business meeting, lecture, movie theater and so on. In any event, the whatever the mechanism or application controlling enforcement of the policies 510, the device 110 may receive a notification, instruction or other message notifying the user or device 110 when the device 110 has exited the sensitive location 112 so that the user or the device 110 may know that the policies 510 are no longer in effect outside of the sensitive location 110 and allow the disable modules to be re-enabled or otherwise powered back on. Example methods for obtaining and implementing such policies 510 are shown in and described with respect to FIG. 6, FIG. 7, and FIG. 8, below.

Figure 6:
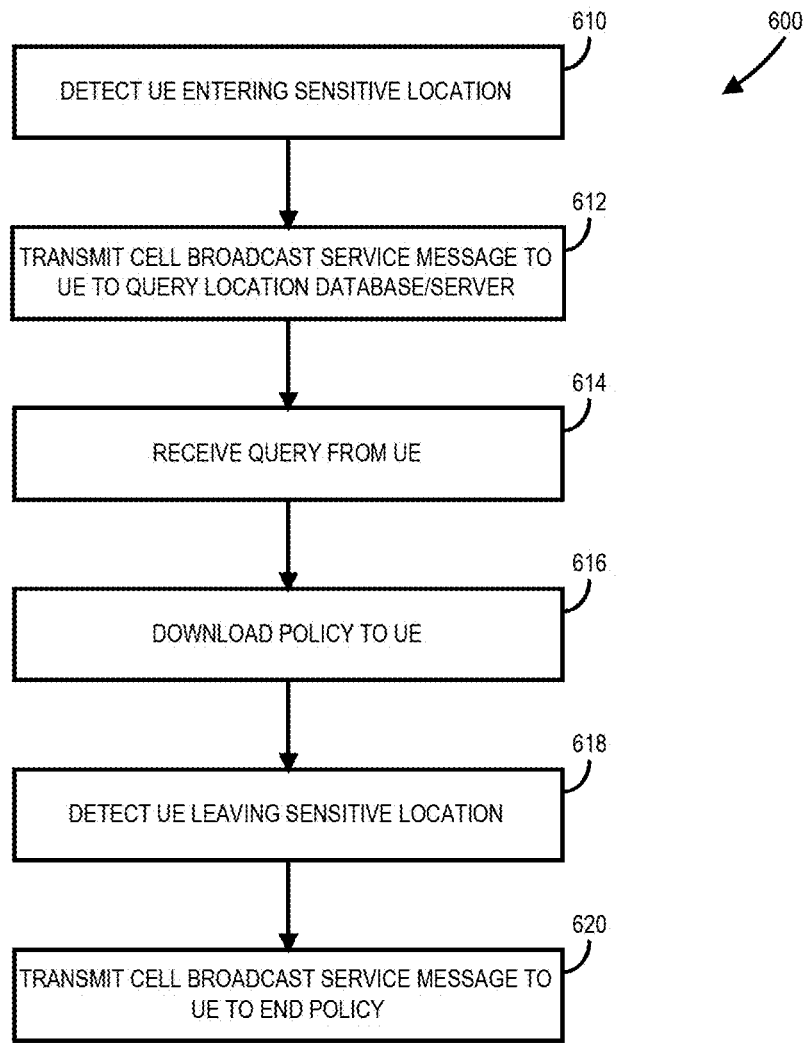
FIG. 6 is a flow diagram of a method to implement deterministic device behavior in accordance with one or more embodiments.

Referring now to FIG. 6, a flow diagram of a method to implement deterministic device behavior in accordance with one or more embodiments will be discussed. Although method 600 of FIG. 6 illustrates one particular embodiment of a method to implement deterministic device behavior, other embodiments of method 600 may include greater or fewer blocks than shown, and/or in various different orders, and the scope of the claimed subject matter is not limited in this respect. At block 610, deterministic system 100 may detect the device 110, in this example equipment (UE), entering sensitive location 112. At block 612, a cell broadcast service (CBS) message is transmitted to device 110 instructing device 110 to query location database/server 120. The location database/server 120 receives the query from device 110 at block 614, and downloads the policy or policies to the device at block 616. The user and/or the device 110 may implement the policy or policies as discussed herein while the device 110 is located within sensitive area 112. At block 618 deterministic system 110 detects if the device 110 leaves the sensitive location 112, and then may transmit at block 620 another cell broadcast service message to the device 110 that it is now okay to end enforcement of the policy or policies.

Figure 7:
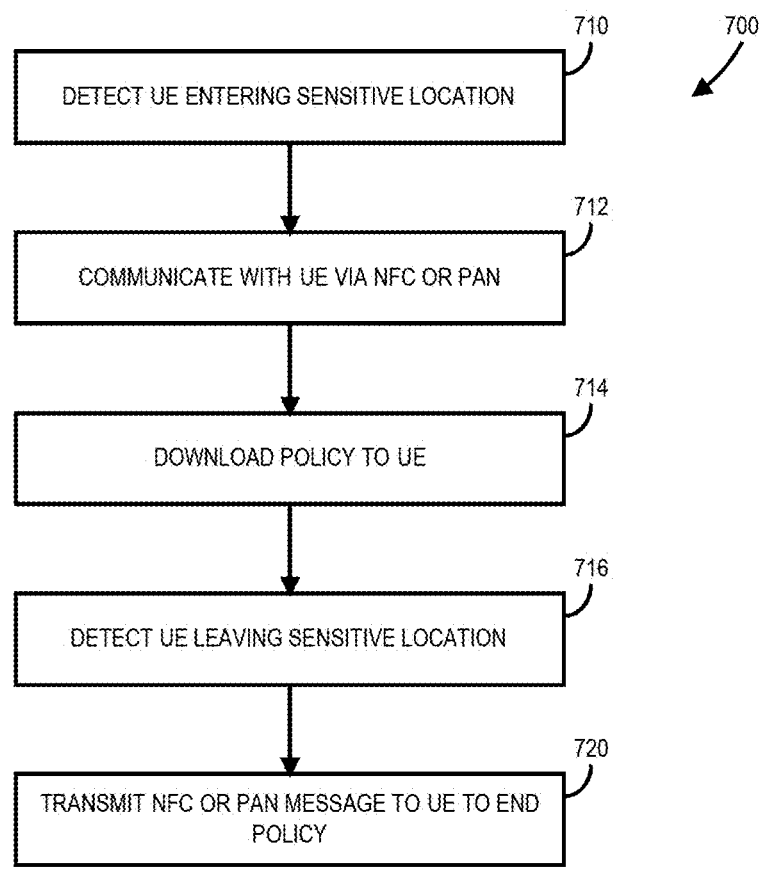
FIG. 7 is a flow diagram of a method to implement deterministic device behavior utilizing near field communications or personal area network communications in accordance with one or more embodiments.

Referring now to FIG. 7, a flow diagram of a method to implement deterministic device behavior utilizing near field communications or personal area network communications in accordance with one or more embodiments will be discussed. Although method 700 of FIG. 7 illustrates one particular embodiment of a method to implement deterministic device behavior utilizing near field communications or personal area network communications, other embodiments of method 700 may include greater or fewer blocks than shown, and/or in various different orders, and the scope of the claimed subject matter is not limited in this respect. At block 710, the deterministic system 100 may detect device 110 entering sensitive location 112. At block 712 communication with the device 110 may occur via near field communications (NFC) or personal area network (PAN) communications such as Bluetooth. The device 110 may then download the policy or policies for the sensitive location 112 at block 716. The user and/or the device 110 may implement the policy or policies as discussed herein while the device 110 is located within sensitive area 112. At block 716 deterministic system 110 detects if the device 110 leaves the sensitive location 112, and then may transmit at block 718 another cell broadcast service message to the device 110 that it is now okay to end enforcement of the policy or policies.

Figure 8:
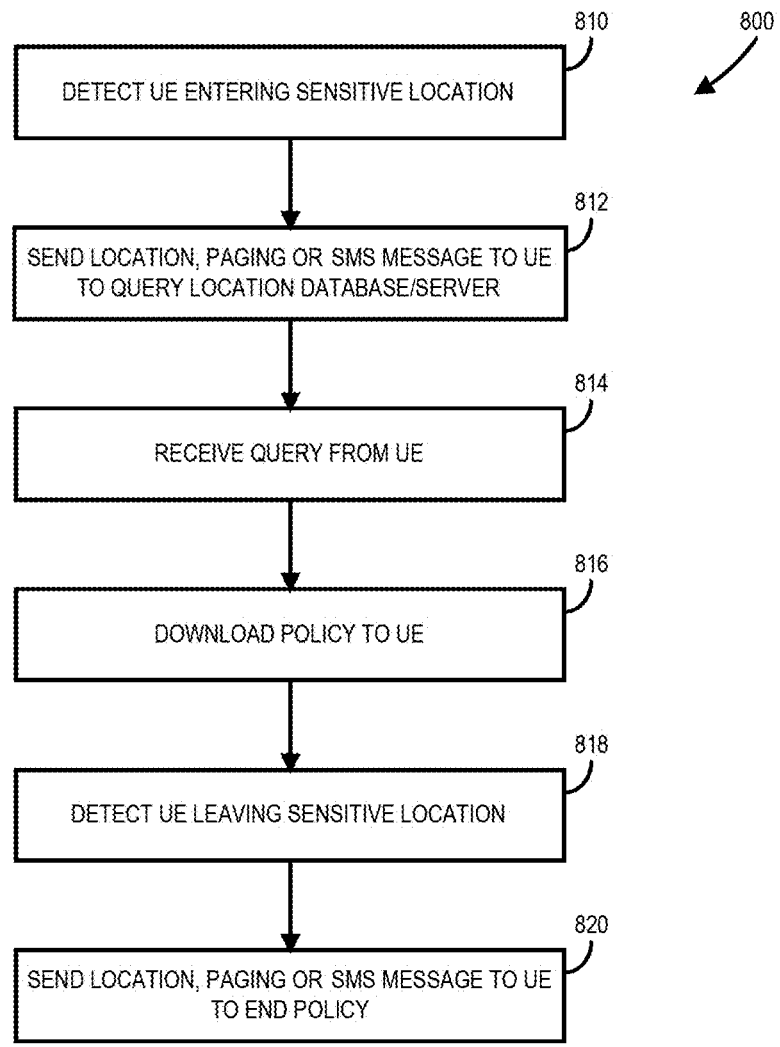
FIG. 8 is a flow diagram of a method to implement deterministic device behavior utilizing a location update, paging, or a short message service (SMS) server in accordance with one or more embodiments.

Referring now to FIG. 8, a flow diagram of a method to implement deterministic device behavior utilizing a location update, paging, or a short message service (SMS) server in accordance with one or more embodiments will be discussed. Although method 800 of FIG. 8 illustrates one particular embodiment of a method to implement deterministic device behavior utilizing a location update, paging, or a short message service (SMS) server, other embodiments of method 800 may include greater or fewer blocks than shown, and/or in various different orders, and the scope of the claimed subject matter is not limited in this respect. At block 810, the deterministic system 100 may detect the device 110 entering sensitive location 112. At block 812, a location update, paging or short message service (SMS) message may be sent to the device instructing the device 110 to query the location database/server 120. The location database/server 120 may receive the query from the device 110 at block 814, and may download the policy or policies for the sensitive location 112 to the device 110 at block 816. The user and/or the device 110 may implement the policy or policies as discussed herein while the device 110 is located within sensitive area 112. At block 818 deterministic system 110 detects if the device 110 leaves the sensitive location 112, and then may send at block 820 a location update, paging, or SMS message to the device 110 that it is now okay to end enforcement of the policy or policies.

Figure 9:
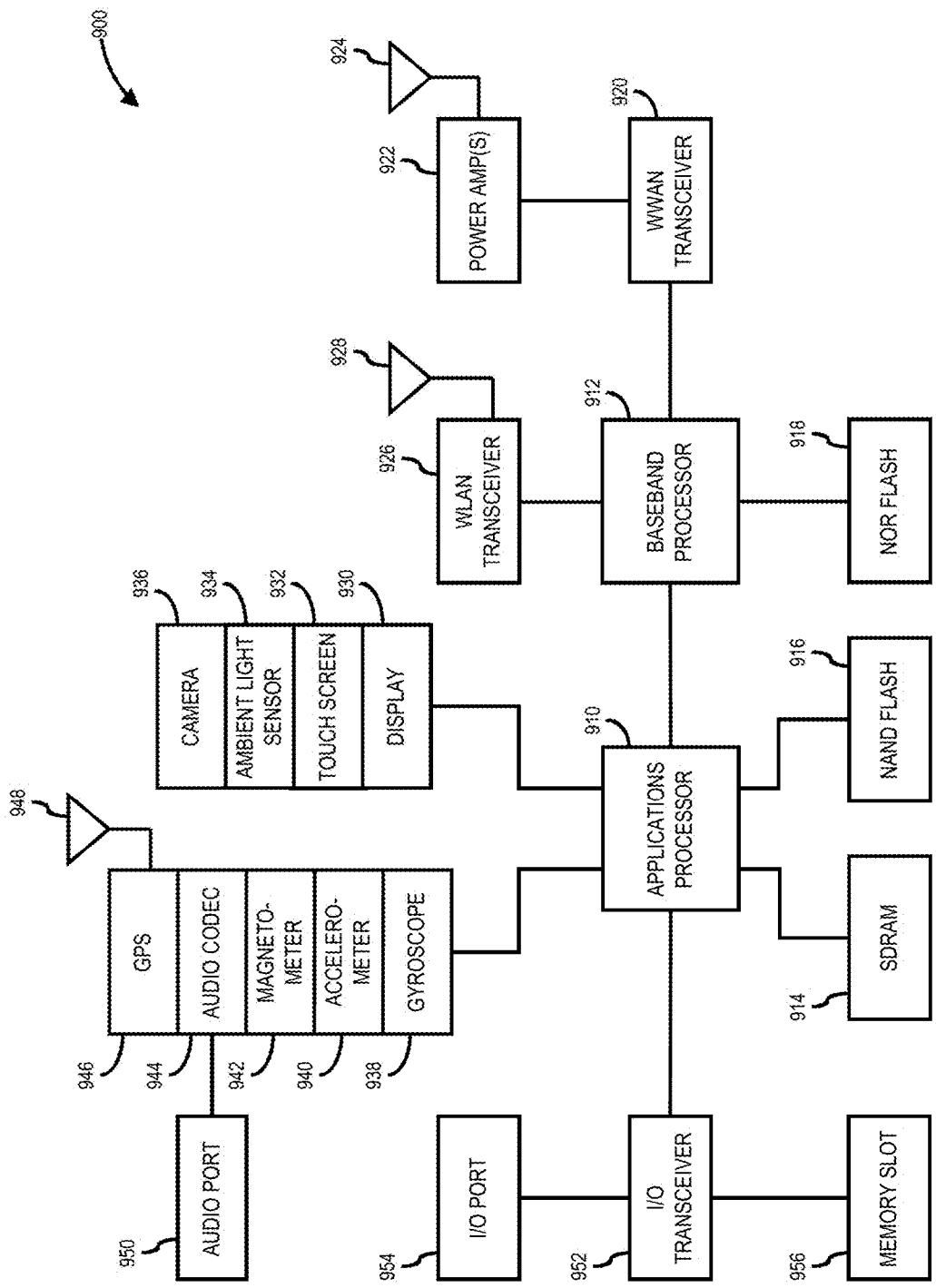
FIG. 9 is a block diagram of an information handling system capable of implementing deterministic behavior in accordance with one or more embodiments.

Referring now to FIG. 9, a block diagram of an information handling system capable of implementing deterministic behavior in accordance with one or more embodiments will be discussed. Information handling system 900 of FIG. 9 may tangibly embody one or more of any of the network elements, infrastructure nodes, or devices of the deterministic system 100 as shown in and described with respect to FIG. 1, FIG. 2, FIG. 3, or FIG. 4. For example, information handling system 900 may represent the hardware of device 110, cell broadcast center 116, cell broadcast entity 118, location database/server 120, NFC/PAN reader 310, and/or server 410 with greater or fewer components depending on the hardware specifications of the particular device, node, or network element. Although information handling system 900 represents one example of several types of computing platforms, information handling system 900 may include more or fewer elements and/or different arrangements of elements than shown in FIG. 9, and the scope of the claimed subject matter is not limited in these respects.

In one or more embodiments, information handling system 900 may include an applications processor 910 and a baseband processor 912. Applications processor 910 may be utilized as a general purpose processor to run applications and the various subsystems for information handling system 900. Applications processor 910 may include a single core or alternatively may include multiple processing cores wherein one or more of the cores may comprise a digital signal processor or digital signal processing core. Furthermore, applications processor 910 may include a graphics processor or coprocessor disposed on the same chip, or alternatively a graphics processor coupled to applications processor 910 may comprise a separate, discrete graphics chip. Applications processor 910 may include on board memory such as cache memory, and further may be coupled to external memory devices such as synchronous dynamic random access memory (SDRAM) 914 for storing and/or executing applications during operation, and NAND flash 916 for storing applications and/or data even when information handling system 900 is powered off. Baseband processor 912 may control the broadband radio functions for information handling system 900. Baseband processor 912 may store code for controlling such broadband radio functions in a NOR flash 918. Baseband processor 912 controls a wireless wide area network (WWAN) transceiver 920 which is used for modulating and/or demodulating broadband network signals, for example for communicating via a 3GPP LTE or Fourth Generation (4G) network or the like as discussed herein with respect to FIG. 1. The WWAN transceiver 920 couples to one or more power amps 922 respectively coupled to one or more antennas 924 for sending and receiving radio-frequency signals via the WWAN broadband network. The baseband processor 912 also may control a wireless local area network (WLAN) transceiver 926 coupled to one or more suitable antennas 928 and which may be capable of communicating via a Wi-Fi, Bluetooth, and/or an amplitude modulation (AM) or frequency modulation (FM) radio standard including an IEEE 802.11a/b/g/n standard or the like. It should be noted that these are merely example implementations for applications processor 910 and baseband processor 912, and the scope of the claimed subject matter is not limited in these respects. For example, any one or more of SDRAM 914, NAND flash 916 and/or NOR flash 918 may comprise other types of memory technology such as magnetic memory, chalcogenide memory, phase change memory, or ovonic memory, and the scope of the claimed subject matter is not limited in this respect.

In one or more embodiments, applications processor 910 may drive a display 930 for displaying various information or data, and may further receive touch input from a user via a touch screen 932 for example via a finger or a stylus. An ambient light sensor 934 may be utilized to detect an amount of ambient light in which information handling system 900 is operating, for example to control a brightness or contrast value for display 930 as a function of the intensity of ambient light detected by ambient light sensor 934. One or more cameras 936 may be utilized to capture images that are processed by applications processor 910 and/or at least temporarily stored in NAND flash 916. Furthermore, applications processor may couple to a gyroscope 938, accelerometer 940, magnetometer 942, audio coder/decoder (CODEC) 944, and/or global positioning system (GPS) controller 946 coupled to an appropriate GPS antenna 948, for detection of various environmental properties including location, movement, and/or orientation of information handling system 900. Alternatively, controller 746 may comprise a Global Navigation Satellite System (GNSS) controller. Audio CODEC 944 may be coupled to one or more audio ports 950 to provide microphone input and speaker outputs either via internal devices and/or via external devices coupled to information handling system via the audio ports 950, for example via a headphone and microphone jack. In addition, applications processor 910 may couple to one or more input/output (I/O) transceivers 952 to couple to one or more I/O ports 954 such as a universal serial bus (USB) port, a high-definition multimedia interface (HDMI) port, a serial port, and so on. Furthermore, one or more of the I/O transceivers 952 may couple to one or more memory slots 956 for optional removable memory such as secure digital (SD) card or a subscriber identity module (SIM) card, although the scope of the claimed subject matter is not limited in these respects.

Figure 10:
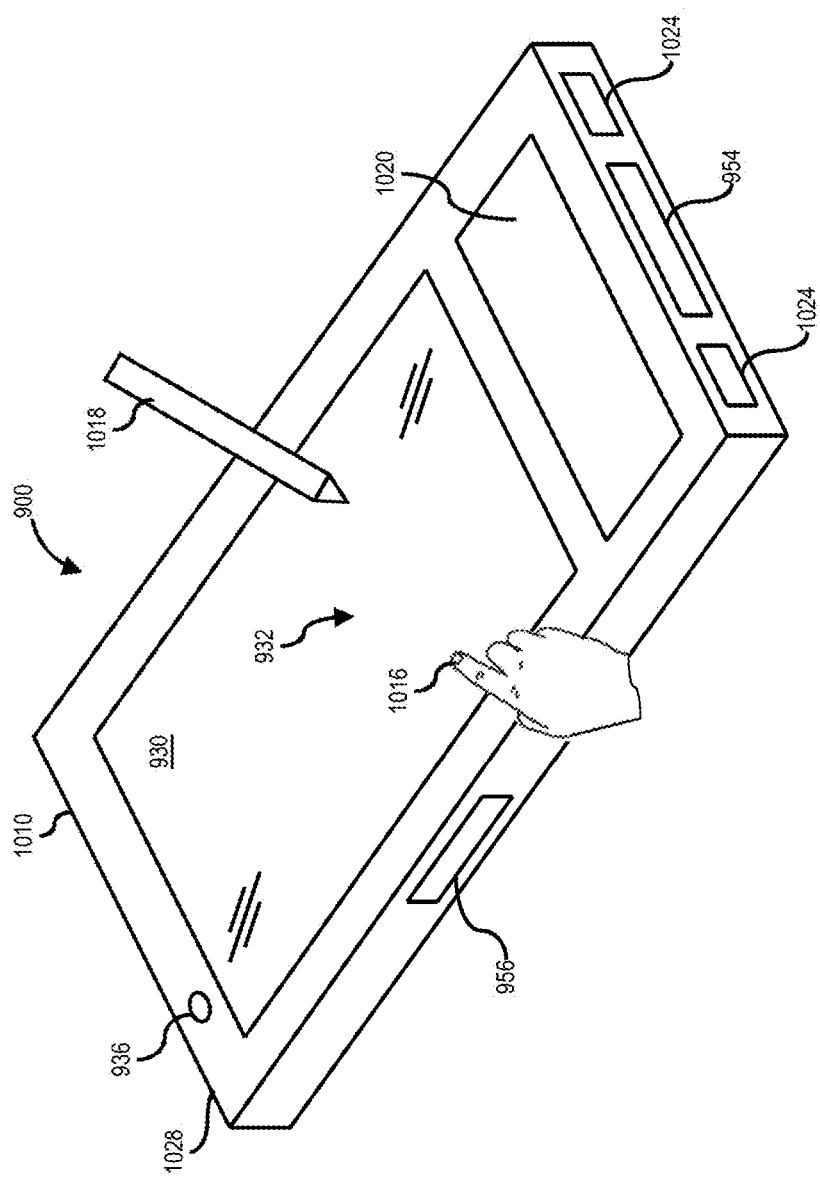
FIG. 10 is an isometric view of the information handling system of FIG. 9 that optionally may include a touch screen in accordance with one or more embodiments.

Referring now to FIG. 10, an isometric view of the information handling system of FIG. 9 that optionally may include a touch screen in accordance with one or more embodiments will be discussed. FIG. 10 shows an example implementation of information handling system 900 of FIG. 9 tangibly embodied as a cellular telephone, smartphone, or tablet type device or the like. In one or more embodiments, the information handling system 900 may comprise any one of the user equipment (UE) devices 110 of FIG. 1, FIG. 2, FIG. 3, or FIG. 4, although the scope of the claimed subject matter is not limited in this respect. The information handling system 900 may comprise a housing 1010 having a display 930 which may include a touch screen 932 for receiving tactile input control and commands via a finger 1016 of a user and/or a via stylus 818 to control one or more applications processors 910. The housing 1010 may house one or more components of information handling system 900, for example one or more applications processors 910, one or more of SDRAM 914, NAND flash 916, NOR flash 918, baseband processor 912, and/or WWAN transceiver 920. The information handling system 900 further may optionally include a physical actuator area 1020 which may comprise a keyboard or buttons for controlling information handling system via one or more buttons or switches. The information handling system 900 may also include a memory port or slot 956 for receiving non-volatile memory such as flash memory, for example in the form of a secure digital (SD) card or a subscriber identity module (SIM) card. Optionally, the information handling system 900 may further include one or more speakers and/or microphones 1024 and a connection port 954 for connecting the information handling system 900 to another electronic device, dock, display, battery charger, and so on. In addition, information handling system 900 may include a headphone or speaker jack 1028 and one or more cameras 936 on one or more sides of the housing 1010. It should be noted that the information handling system 900 of FIG. 10 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to intelligent location tagging for deterministic behavior and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    transmitting one or more cell broadcast service messages to a cell broadcast area, wherein the one or more cell broadcast service messages include a global positioning system (GPS) coordinate for a sensitive location within the cell broadcast area and an address of a location database or server;
    triggering a device to query the location database or server in response to receiving the one or more cell broadcast service messages to obtain at least one or more policies related to deterministic behavior if the device enters the sensitive location based on the GPS coordinate of the sensitive location contained in the cell broadcast service message; and wherein the one or more policies cause the device to execute the deterministic behavior while the device is in the sensitive location.

2. A method as claimed in claim 1, wherein said triggering comprises sending a trigger to a cell broadcast center to cause the cell broadcast center to communicate with the device via the one or more cell broadcast service messages.

3. A method as claimed in claim 1, wherein said triggering comprises sending a message to the device, the message being interpretable by a user of the device or by an application running on the device.

4. A method as claimed in claim 3, wherein the message includes the one or more policies.

5. A method as claimed in claim 1, wherein said triggering comprises communicating with the device via near field communication (NFC) or personal area network (PAN) communication.

6. A method as claimed in claim 1, wherein said triggering comprises sending a location update message, a routing message, a tracking area update message, a paging message, a short message service (SMS) message, or an application layer message to the device.

7. A method as claimed in claim 1, wherein the deterministic behavior comprises disabling one or more modules of the device.

8. A method as claimed in claim 1, further comprising:
determining if the device is exiting the sensitive location; and
transmitting an indication to the device to cease execution of the deterministic behavior if the device exits the sensitive location.

9. A mobile station, comprising:
a radio-frequency transceiver; and
a processor coupled to the radio-frequency transceiver, wherein the processor is configured to:
receive one or more cell broadcast service messages, wherein the one or more cell broadcast messages include a global positioning system (GPS) coordinate for a regulated location within the cell broadcast area and an address of a location database or server;
query the location database or server in response to receiving the one or more cell broadcast service messages to obtain at least one or more policies related to deterministic behavior of the mobile station enters the regulated location based on the GPS coordinate of the sensitive location contained in the cell broadcast service message;
in response to the query, receive a message from the location database or server regarding one or more policies for the regulated location; and
execute the one or more policies while in the regulated location.

10. A mobile station as claimed in claim 9, further comprising a Global Positioning System (GPS) module, a near field communication module (NFC) or a personal area network (PAN), to determine if the regulated location has been entered.

11. A mobile station as claimed in claim 9, wherein the processor is further configured receive the message regarding the one or more policies from a location database via near field communication (NFC) or personal area network (PAN) communication.

12. A mobile station as claimed in claim 9, wherein the processor is further configured to execute the one or more policies by disabling one or more modules coupled to the processor.

13. A mobile station as claimed in claim 9, further comprising a touch screen to receive an input command from a finger or a stylus to control the processor.

14. An information handling system, comprising:
a radio-frequency transceiver; and
a processor coupled to the radio-frequency transceiver, wherein the processor is configured to:
transmit one or more cell broadcast service messages to a cell broadcast area, wherein the one or more cell broadcast service messages include a global positioning system (GPS) coordinate for a sensitive area within the cell broadcast area and an address of a location database or server, wherein a device queries the location database or server in response to receiving the one or more cell broadcast service messages to obtain at least one or more policies related to deterministic behavior if the device enters the sensitive location based on the GPS coordinate of the sensitive location contained in the cell broadcast service message; and
in response to the query, transmit a message to the device regarding one or more policies governing device operation in the sensitive area.

15. An information handling system as claimed in claim 14, wherein the processor is configured to determine if the device has entered sensitive location based at least in part on a Global Positioning System (GPS) coordinate location of the device, a cellular location of the device, or a snooped transmission of the device from which an identifier (ID) of the device is determinable.

16. An information handling system as claimed in claim 14, wherein the message includes one or more policies readable by a user of the device or by an application running on the device, or combinations thereof.

17. An information handling system as claimed in claim 14, wherein the message comprises one or more instructions that are optionally executed by the device or automatically executed by the device, or combinations thereof.

18. An information handling system as claimed in claim 14, wherein the message comprises instructions to shut down one or more modules of the device while the device is in the sensitive location.

19. An article of manufacture comprising a non-transitory storage medium having instructions stored thereon that, if executed, result in:
transmitting one or more cell broadcast service messages to a cell broadcast area, wherein the one or more cell broadcast service messages include a global positioning system (GPS) coordinate for a policy governed location within the cell broadcast area and an address of a location database or server;
triggering a device to query a location database or server in response to the one or more cell broadcast service messages to obtain at least one or more policies related to deterministic behavior if the device enters the policy governed location based on the GPS coordinate of the policy governed location contained in the cell broadcast service message; and
wherein the one or more policies cause the device to execute the deterministic behavior while the device is in the policy governed location.

20. An article of manufacture as claimed in claim 19, wherein said detecting is based at least in part on determining a Global Positioning System (GPS) coordinate location of the device, obtaining a cellular location of the device, or snooping a transmission of the device to determine an identifier (ID) of the device.

21. An article of manufacture as claimed in claim 19, wherein said sending comprises causing a cell broadcast center to communicate with the device.

22. An article of manufacture as claimed in claim 19, wherein the message sent to the device is interpretable by a user of the device or by an application running on the device.

23. An article of manufacture as claimed in claim 22, wherein the message includes the one or more policies.

24. An article of manufacture as claimed in claim 19, wherein said sending comprises communicating with the device via near field communication (NFC) or personal area network (PAN) communication.

25. An article of manufacture as claimed in claim 19, wherein the message comprises a location update message, a routing message, a tracking area update message, a paging message, a short message service (SMS) message, or an application layer message to the device.

26. An article of manufacture as claimed in claim 19, wherein the deterministic behavior comprises disabling one or more modules of the device.

27. An article of manufacture as claimed in claim 19, wherein the instructions, if executed, further result in:
   determining if the device is exiting the policy governed location; and
   transmitting an indication to the device to cease execution of the deterministic behavior if the device exits the policy governed location.

* * * * *